United States Patent [19]

Daude

[11] Patent Number: 4,457,479
[45] Date of Patent: Jul. 3, 1984

[54] WINGLETS FOR AIRCRAFT WING TIPS

[76] Inventor: Martine Daude, Résidence les Tuileries 4, Square Castiglione, 78150 Le Chesnay, France

[21] Appl. No.: 380,473

[22] Filed: May 20, 1982

[30] Foreign Application Priority Data

Feb. 15, 1982 [FR] France ............................... 82 02548

[51] Int. Cl.$^3$ ............................................. B64C 13/16
[52] U.S. Cl. .................................... 244/203; 244/91; 244/76 R; 244/78
[58] Field of Search .................... 244/91, 199, 203, 87, 244/75 R, 198, 75 A, 76 R, 76 A, 76 B, 76 C; 33/DIG. 13

[56] References Cited

U.S. PATENT DOCUMENTS

| 2,316,235 | 4/1943 | Gast | 244/203 |
| 2,586,785 | 2/1952 | Carr | 244/75 R |
| 3,103,328 | 9/1963 | Rafferty | 244/76 R |
| 3,134,562 | 5/1964 | Hovgard | 244/203 |
| 3,136,154 | 6/1964 | Christensen | 73/775 |
| 3,940,093 | 2/1976 | Cabriere | 244/203 |
| 4,205,810 | 6/1980 | Ishimitsu | 244/91 |
| 4,247,063 | 1/1981 | Jenkins | 244/199 |

FOREIGN PATENT DOCUMENTS

| 652710 | 3/1929 | France | 244/91 |
| 625636 | 6/1949 | United Kingdom | 244/76 C |

OTHER PUBLICATIONS

"Instruments", vol. 24, p. 400, Apr. 1951.

Primary Examiner—Trygve M. Blix
Assistant Examiner—Rodney Corl
Attorney, Agent, or Firm—Steinberg & Raskin

[57] ABSTRACT

A wing assembly in an aircraft includes a pair of wings and a winglet situated at each of the wing tips, the winglets or portions thereof being movably mounted. In order to avoid the need for providing structural reinforcement for the wings to accommodate the additional bending moments acting on the wings due to the presence of the winglets, a system is provided for automatically moving the winglets between a first position wherein each winglet has a first aerodynamically optimal angle of attack and a second position wherein each winglet has a second minimal angle of attack wherein the winglets add substantially no bending moment to the wings, the winglets being so automatically moved in response to the stress acting on the wing.

7 Claims, 9 Drawing Figures

WINGLETS FOR AIRCRAFT WING TIPS

FIELD OF THE INVENTION

This invention relates to the field of aircraft, and particularly to improvements in winglets for aircraft wing tips intended to improve the aerodynamics of the wings without notably increasing the weight of the structure.

BACKGROUND OF THE INVENTION

Winglets have been known for years and have been mounted on aircraft such as, for example, the LEAR JET 28 or American KC 135. It is known that such winglets comprise substantially vertical walls placed on the wing tips of an aircraft which have the property of straightening out the swirling air currents at the wing tip. Actually, in flight, excessive air pressures are produced on the under surface of the wing and, on the other hand, low pressures act on the upper wing surface. The air at the tip of the wings therefore tends to move from the under wing surface to the upper wing surface and thus create vortices at the wing tip. Winglets make it possible to modify the lift distribution all along the wing span and thus improve the aerodynamic efficiency of the wing.

The considerable stresses to which the aircraft structures are subjected are not continuous but occasional. For example, while the aircraft cruises at altitude, the wing often supports only a load corresponding approximately to the weight of the aircraft. However, in the occasional instances of a sharp turn or in a turbulent atmosphere the wing must support a load equal to several times the weight of the aircraft (between 4 and 15 times, depending on the type of aircraft). U.S. Pat. Nos. 4,190,219; 4,205,810 and 4,245,804 disclose very specific forms relating to particular winglets fastened onto the wing tips which although improving the aerodynamics of the wing, also unfortunately cause a constant increase in the stresses on the wings, particularly in the occasional extreme cases discussed above. These extreme stresses, although in actuality occurring only occasionally, must be taken into account in designing the resistant structure of the aircraft, and the mass of this structure which is thereby increased. Thus, what is gained, on the one hand, in aerodynamics, is lost in great part in the form of added structural mass.

Further, in the prior art, there are fins placed at the end of the wings on aircraft having a pronounced sweepback so that their position well aft on the aircraft gives them a stabilizing role like a standard aircraft fin. When these fins are mobile or comprise a mobile rudder, the two surfaces thus created are not always symmetrical in relation to the aircraft plane of symmetry in order to create a moment enabling the aircraft to turn around its yaw axis (recalling that the yaw axis is generally vertical when the aircraft is horizontal). Actually, these fins do not at all have the same function as winglets which do not have a considerable role or effect on the stability of the aircraft.

SUMMARY OF THE INVENTION

A purpose of the invention is to improve the aerodynamics of an aircraft wing with the use of winglets without the necessity of increasing the structural mass of the wing, i.e., to provide winglets which will not cause the stresses acting on the wings to unduly increase even during the occasional extreme conditions discussed above.

Another purpose is to increase the CL/CD ratio, called the "efficiency" of an aircraft. It is known that CL represents lift coefficient defined by the relation:

$$P = \tfrac{1}{2} \rho \cdot CL \cdot V^2 \cdot S_Z$$

in which: P is the lift force, $\rho$ is the air density, V the speed of the aircraft, $S_Z$ is the reference surface of the wing; and CD is the drag coefficient defined by the formula:

$$F = \tfrac{1}{2} \rho \cdot CD \cdot V^2 \cdot S_x$$

in which: F is the drag force, Sx is the frontal reference surface of the aircraft, and the other parameters have the same definitions as above.

An increase of said ratio brings many advantages, aimed at by the invention, namely, the possibility of increasing the lift force of the aircraft and therefore increasing the payload which it can safely carry at a given speed; reduction of the stalling speed of the aircraft; an improved gliding capability; and, finally, a notable reduction in fuel consumption, which can amount to 3 to 10%, which of course enables the operating range of the aircraft to be increased.

According to the main characteristic of the invention, with the winglets being mounted so as to be movable on the wing tips, means are provided to cause their motion, limited in amplitude, to be constantly symmetrical in relation to the aircraft plane of symmetry and, additionally, automatic winglet moving means are provided for adjusting the angle of attack presented by the winglets, considering the plane of symmetry of the aircraft, as a function of the strains exerted on the wing during flight. In particular, the moving means are adapted to move the winglets to a position wherein they add substantially no bending moment to the wings when the stress acting on the wings reaches or exceeds a certain value.

It is known that the angle of incidence, or angle of attack, of a wing corresponds to the angle formed between the wind velocity vector and the chord of reference of the wing.

In a preferred embodiment each winglet is mounted on the wing tip at three fixed points, two of which, located on the wing, constitute joints forming a hinge to permit rotation of the winglet about a substantially vertical axis. The third fixed point, located on the winglet, is connected to the automatic winglet moving means.

According to an advantageous embodiment, the automatic moving means comprises an hydraulic jack or mechanical system operated by an electrodistributor that is operated by a means for measuring the increases in stresses or strains exerted on the wing. This means can comprise, for example, strain gauges fastened on the resisting wing structure or by an acceleration detector placed under the aircraft.

According to a variation, the automatic moving means can be modified by the aircraft pilot to deflect the winglets more or less to optimize their effect as a function of the flight parameters such as speed and mass of the aircraft, altitude, aircraft configuration, etc..

According to another embodiment, each winglet, instead of comprising a single mobile element, can comprise several parts, some of which are mobile and some fixed, so arranged that the air current, during flight, is carried approximately in the same way as though the winglet unit were mobile.

Still other characteristics will emerge from the following specification, relating to non-limiting embodiments, and illustrated by the accompanying drawings.

DETAILED DESCRIPTION

Figure 1:
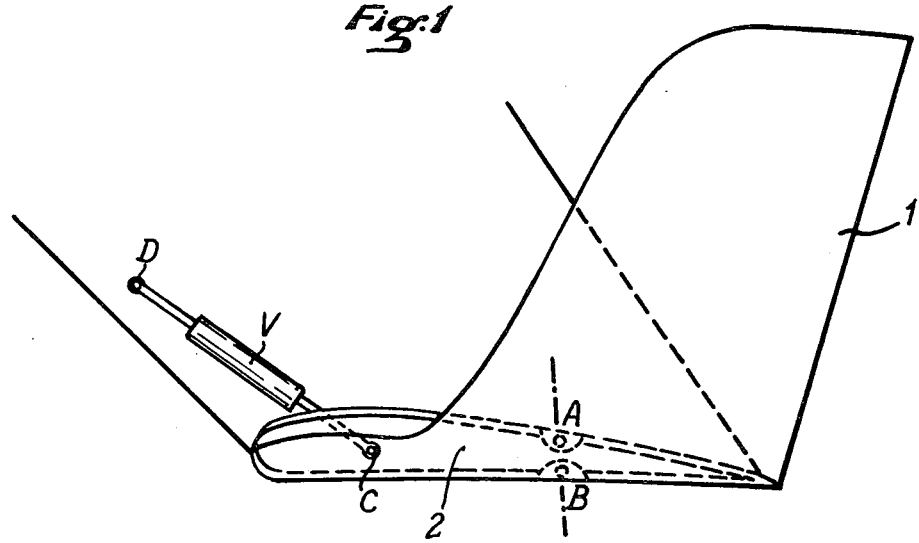
FIGS. 1 to 3 illustrating one example of mounting, in mobile position, a winglet on an aircraft wing tip in accordance with the present invention, with the use of a jack.
Figure 2:
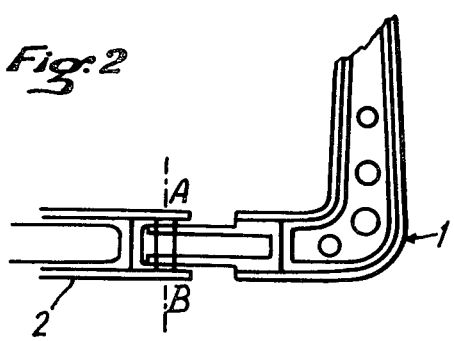
Figure 3:
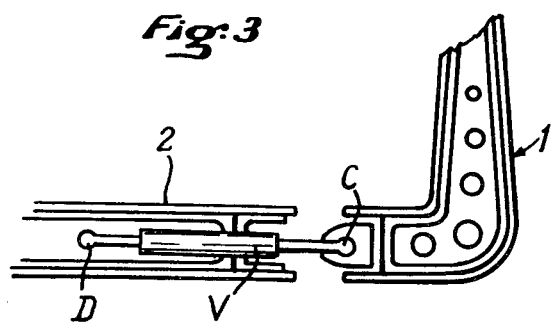

As shown in FIGS. 1 to 3, a winglet 1 according to the invention is mounted at each tip 2 of the aircraft wing so as to be rotatable about a substantially vertical axis with respect to the plane of symmetry of the aircraft, so that the movements or orientations of the two winglets remain symmetrical in relation to this plane.

In the example shown, each winglet 1 (only one shown) is mounted for rotation about fixed points A and B of wing tip 2 and a hydraulic jack V comprising a piston-cylinder arrangement interconnects a point C on the winglet and a fixed point D on the wing structure, for example, by means of ball joints.

Figure 4:
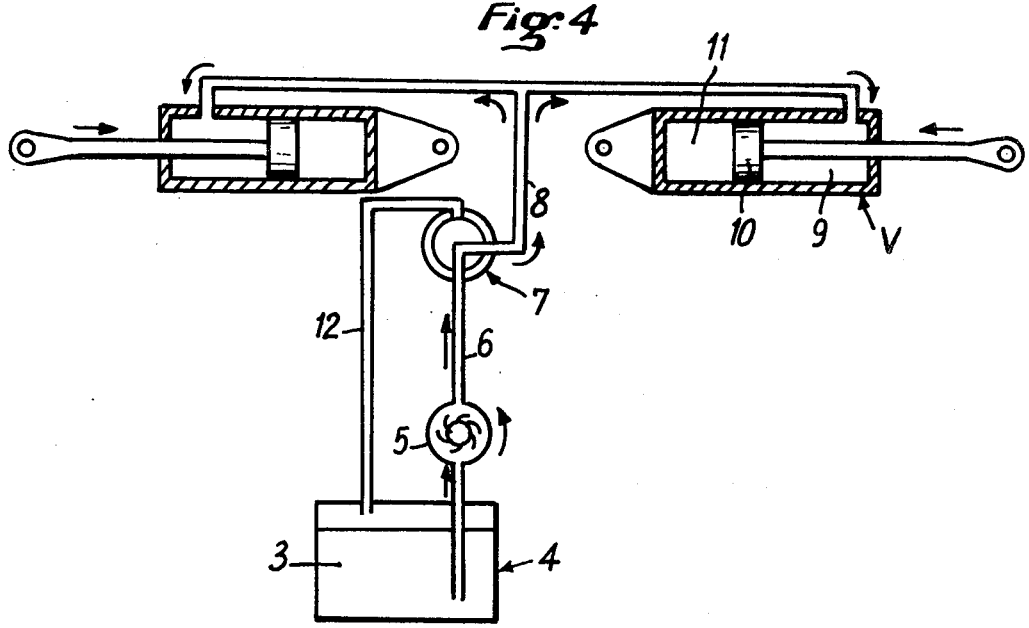
FIG. 4 is a schematic illustration of a hydraulic system for operating the jacks illustrated in FIG. 1.

Each jack V operates such that it assumes a certain position to position the respective winglet 1 at a certain normal or working angle of attack ($\alpha$). To understand this operation, it is useful to refer to the illustration of the hydraulic system shown in FIG. 4 and to the schematic circuit diagram of the automatic control shown in FIG. 5.

Hydraulic fluid 3 contained in container 4 is carried by pump 5 in a pipe 6 to an electrically operated hydraulic fluid distribution valve or electrodistributor 7 having two positions, namely. (1) a work position (shown in FIG. 4) according to which the pipe 6 communicates with a pipe 8 making possible the introduction of hydraulic fluid at high pressure (for example, 2000 to 3000 p.s.i.) into chambers 9 of jacks V which then drives the jack pistons 10 into the jack cylinders thus compressing the air trapped in cylinder chambers 11; and (2) a rest position where distributor 7 connects the pipe 8 with a return pipe 12. The electrodistributor 7 is normally internally biased to the rest position wherein the compressed air in chambers 11 pushes pistons 10 outwardly of the cylinders, positioning the winglets so that their angle of incidence (or attack) $\alpha$ is slight or even negative. The hydraulic fluid contained in chambers 9 is then forced back into container 4. Thus, the winglets are normally biased by the trapped air at 11 in jacks V towards their rest positions wherein the angle of attack is slight or even negative.

Figure 5:
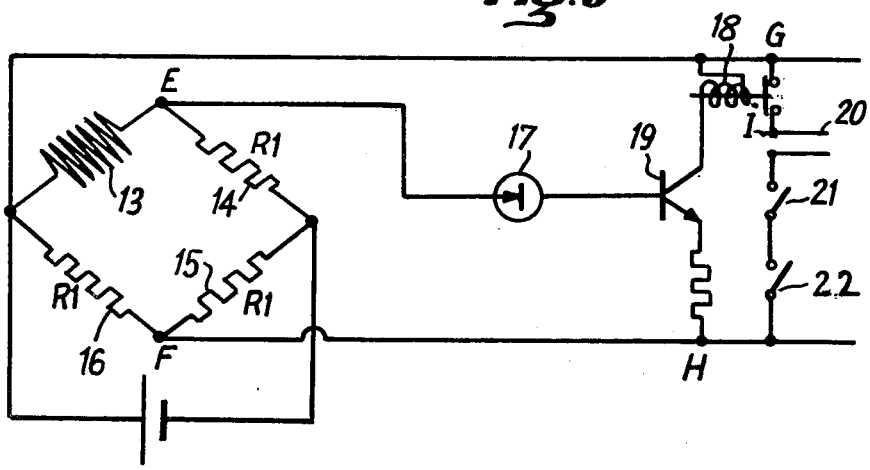
FIG. 5 is a schematic illustration of one type of automatic mechanism, namely an electrodistributor, for controlling said hydraulic system.

An example of means for controlling the electrodistributor 7 is shown by way of a non-limiting example in FIG. 5. Strain gauge 13 is glued to the lower surface of the wing at a place where the metal will be stressed to a relatively large extent from the strain viewpoint when the aircraft encounters the occasional extreme conditions noted above, for example, in the center of the lower surface of a wing. It is known that strain gauges have an electrical resistance exhibiting substantial variations when the support substrate to which they are connected expands, even very slightly.

Gauge 13 is placed in a standard Wheatstone bridge to detect resistance variations. The resistance $R_1$ of three resistors designated 14, 15 and 16 is equal to the resistance value of the strain gauge when the wing structure has been strained or deformed to an extend that should not be exceeded. When the resistance value of the strain gauge is less than $R_1$, i.e., when the wing has not been stressed beyond the chosen upper limit, the potential difference between points E and F has a tendency to create an electric current in a direction such that such current is broken by diode 17. Relay 18 is not energized and contact between points G and H is established. In this case, the electrodistributor 7 is in its work position. As soon as the wing structure reaches a deformation or strain level that gives the strain gauge a resistance greater than $R_1$, the generated potential difference creates an electric current in a direction which will not be broken by diode 17. The current is amplified by transistor 19 and passes between points G and H through transistor 19 energizing relay 18. The relay then breaks the contact between terminals G and I which moves the electrodistributor 7 to its rest position.

Figure 7:
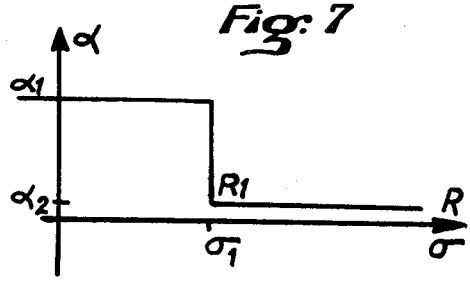

This embodiment makes it possible to define an automatic correspondence between the angle of attack (or incidence) $\alpha$ of the winglet and stress level $\sigma$ of the wing structure (see FIG. 7). The winglets will remain in their working positions, i.e., oriented at the working angle of attack $\alpha_1$ at all times until the strain in the wing reaches a predetermined value whereupon the winglets are rotated through actuation of the jacks V to their slight or even negative rest angles of attack. In this manner, since the moments acting on the wing at the time of occasional large stresses are not further increased by the presence of the winglets (as in the case of conventional arrangements) the wings need not be designed with increased mass due to the presence of the winglets.

A switch 22 (FIG. 5), placed in the flight compartment, makes it possible to manually actuate the electrodistributor 7 to its rest position if flight or safety conditions require it. Further, another switch 21, controlled by a standard type incidence probe, makes it possible to cut off the distributor power current when the aircraft is in a position close to stall, i.e., when the value of the aircraft angle of incidence reaches a maximum limit equal to a value between about 10 and 40 degrees, depending upon the type of aircraft. By its opening, this switch 21 has the effect of de-energizing the electrodistributor 7, which causes the winglets to return to their rest position corresponding to angle $\alpha_2$ of FIGS. 6 and 7. In this position, the air streams that flow over the wing are better carried to the upper wing surface, which improves the efficiency of the ailerons during stall.

It is possible to improve the automatic control device still further according to the invention by installing several strain gauges in series at various points of the wing surface.

Moreover, in the Wheatstone bridge of FIG. 5, the gauges 13 are placed at 90° to one another and compensated by resistors intended to eliminate the influence of expansions due to temperature variations.

Rest position $\alpha_2$ of the winglet can be such that it makes it possible to direct the air streams toward the plane of symmetry of the aircraft, i.e., toward the ailerons. This has the effect of improving the behavior of the aircraft during stall by supplying the ailerons with a greater air delivery and simultaneously increasing control of the aircraft during stall.

Figure 6:
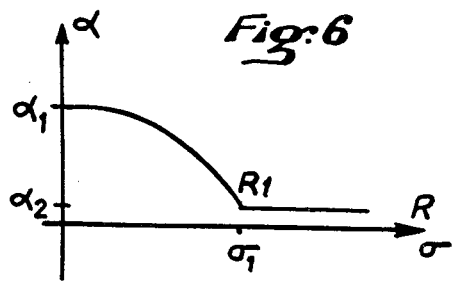
FIGS. 6 and 7 are graphical representations illustrates the correspondence between the angle of attack $\alpha$ of the mobile winglets and the stress level $\sigma$ (resistance R) of the wing structure.

According to another embodiment, it is possible to gradually vary the angle as shown in FIG. 6 of attack alpha (from $\alpha_1$ to $\alpha_2$) of the winglet using a standard type servocontrol, i.e., a slave to the function of the strain existing in the structure measured by one or more strain gauges, or by a conventional acceleration detector placed on the aircraft.

It will be noted that, in FIGS. 6 and 7, $\alpha_1$ corresponds to the maximum angle of attack of the winglet, $\alpha_2$ corresponds to the rest (neutral) position of winglet; $\sigma_1$ is the maximum safety strain of the aircraft structure and $R_1$ (already used for FIG. 5) is the resistance of the strain gauge corresponding to strain $\sigma_1$.

Figure 8:
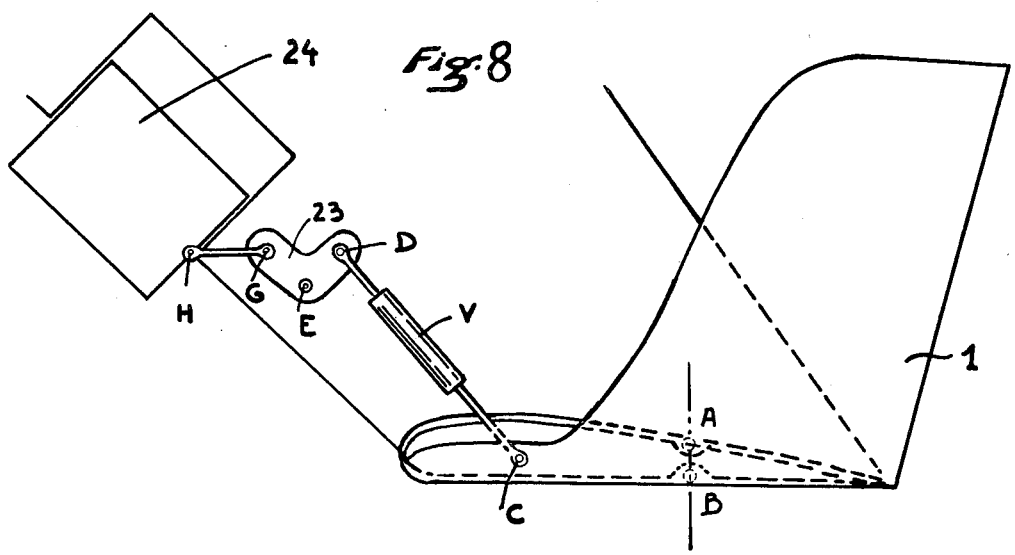
FIGS. 8 and 9 illustrates an another automatic mechanism for connecting wing slats with jacks through a mechanical linkage system, FIG. 8 showing the slats "out" position and FIG. 9 showing the slats "in" position.
Figure 9:
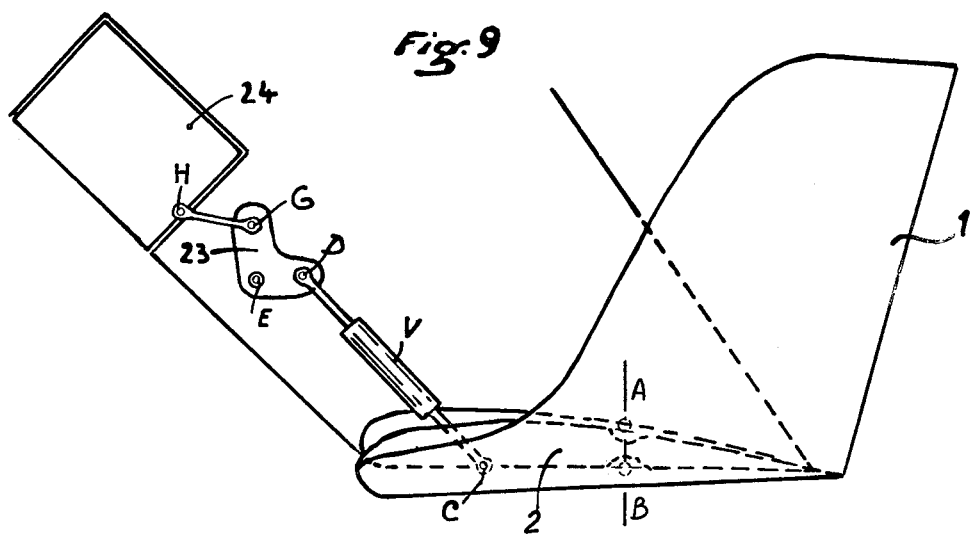

Finally, according to another embodiment it is possible to modify the two positions $\alpha_1$ and $\alpha_2$ of the winglets by adding a bellcrank mechanism 23 for displacing the point D as indicated on FIGS. 8 and 9. This mechanism 23 is connected to a mobile element 24 of the aircraft such as conventional slats 24 (FIG. 9) or the flaps) which are in a retracted position at high speed and generally in a deployed position at low speed.

H and G are the two ends of a rod connecting the slat 24 and mechanism 23. E is a pivot axis enabling the pivotal rotation of mechanism 23. D is a ball joint connecting the jack (V) to the mechanism 23.

At low speed the slats or flaps 24 are generally extended automatically or by conventional apparatus in a deployed position (FIG. 8). The structural wing stresses are limited. Accordingly, a large deflection of the winglets can be established without any risk of significant wing structural stresses.

At high speed the slats (or flaps) are in the "in" position and the winglets deflections are less important.

The above improvements of the invention can constitute a retrofit assembly for structurally conventional wing assemblies of an aircraft for which it is desired to improve the wing efficiency and reduce fuel consumption in cruise, without, however, having to modify the resistant structure of the wing and of the fuselage of the aircraft. In other words, the necessity of increasing the structural mass of the wing in order to safely accommodate the increased stresses and strains which normally act on the wing in the occasional extreme conditions due to the presence of conventional winglets is eliminated since, in accordance with the present invention, the winglets will automatically move to their rest positions presenting a slight or even negative angle of attack when the stresses in the wing reach a predetermined maximum value. It is therefore not necessary to provide additional structural reinforcement for the wings equipped with the winglets of the present invention. Of course, the invention also applies to the design of a new aircraft designed to be lighter and making it possible to avoid considerable stresses on the structure, thus overcoming fatigue of the materials used.

While the invention has been described in detail above, it is to be understood that this detailed description is by way of example only, and the protection granted is to be limited only within the spirit of the invention and the scope of the following claims.

I claim:

1. In an aircraft including a pair of structurally conventional elongate wings, each having a leading edge, a trailing edge and a wing tip, the improvement comprising a retrofit assembly for said structurally conventional wings, said retrofit assembly including
    a winglet situated at each of said wing tips so as to extend substantially upwardly therefrom, at least a portion of the winglets being movably mounted; and
    means for automatically moving said winglets or said portions thereof symmetrically with respect to the aircraft plane of symmetry between a first position wherein each winglet has a first aerodynamically optimal working angle of attack and a second position wherein the winglet has a second minimal angle of attack wherein said winglets add substantially no bending moment to the wings, said automatic means including means provided on said wings for sensing the stress on said wings such that when said sensed stress reaches a certain predetermined value, said moving means are actuated to move said winglets or movable portions thereof from said first position to said second position.

2. The combination of claim 1 wherein said sensing means of said automatic moving means comprise means for measuring changes in the strain in said wings.

3. The combination of claim 1 wherein said automatic moving means comprise a piston-cylinder arrangement, one of said piston and cylinder being fixed to said wing and the other said piston and cylinder being fixed to a respective winglet or movable portion thereof, and fluid distribution means for activating said piston-cylinder arrangement in response to a signal generated by said sensing means.

4. The combination of claim 2 wherein said means for measuring changes in the strain in said wings include at least one strain gauge fixed to a surface of said wing.

5. The combination of claim 3 wherein said fluid distribution means comprises a pressurized fluid circuit including a two-position electrodistributor coupled to said sensing means.

6. The combination of claim 1 wherein said means for moving said winglets or movable portions thereof include means for sensing the position of wing surfaces such that when the wing surfaces change from one position to another position, said winglets or movable portions thereof are moved from said first position to said second position.

7. The combination of claim 1 wherein said means for sensing the stress on said wings operate said winglet moving means to move said winglets or portions thereof to various intermediate positions between said first and second positions as a function of the stress on said wings.

* * * * *